US008821148B2

(12) United States Patent
Koizumi et al.

(10) Patent No.: US 8,821,148 B2
(45) Date of Patent: Sep. 2, 2014

(54) SHEET FORMING APPARATUS FOR USE WITH DOCTOR BLADE

(75) Inventors: Atsushi Koizumi, Wako (JP); Toshikazu Tanaka, Ishikawa-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 13/636,160

(22) PCT Filed: Mar. 3, 2011

(86) PCT No.: PCT/JP2011/055563
§ 371 (c)(1),
(2), (4) Date: Sep. 20, 2012

(87) PCT Pub. No.: WO2011/118396
PCT Pub. Date: Sep. 29, 2011

(65) Prior Publication Data

US 2013/0022699 A1 Jan. 24, 2013

(30) Foreign Application Priority Data

Mar. 24, 2010 (JP) ................................ 2010-068570

(51) Int. Cl.

| | |
|---|---|
| ***B29D 7/01*** | (2006.01) |
| ***B29D 7/00*** | (2006.01) |
| ***B05C 3/12*** | (2006.01) |
| ***B05C 3/00*** | (2006.01) |
| ***B28B 19/00*** | (2006.01) |
| ***B28B 5/02*** | (2006.01) |
| ***B05C 5/02*** | (2006.01) |
| ***B05C 3/18*** | (2006.01) |
| *B05C 11/02* | (2006.01) |
| *B05C 11/10* | (2006.01) |

(52) U.S. Cl.
CPC ............ *B28B 19/0092* (2013.01); *B28B 5/027* (2013.01); *B05C 11/028* (2013.01); *B05C 11/10* (2013.01); *B05C 5/0254* (2013.01); *B05C 5/027* (2013.01); *B05C 3/18* (2013.01)
USPC ........... 425/224; 425/199; 425/197; 118/419; 118/400

(58) Field of Classification Search
None
See application file for complete search history.

(56) References Cited

U.S. PATENT DOCUMENTS

| | | | | |
|---|---|---|---|---|
| 3,610,201 | A * | 10/1971 | Meyer | 118/24 |
| 4,550,681 | A | 11/1985 | Zimmer et al. | |
| 5,326,401 | A | 7/1994 | MacNaughton et al. | |
| 2002/0023583 | A1 * | 2/2002 | Kumokita et al. | 118/108 |

FOREIGN PATENT DOCUMENTS

| | | |
|---|---|---|
| JP | 10-329118 | 12/1998 |
| JP | 2007-190828 | 8/2007 |

* cited by examiner

*Primary Examiner* — Dah-Wei D Yuan
*Assistant Examiner* — Jethro Pence
(74) *Attorney, Agent, or Firm* — Rankin, Hill & Clark LLP

(57) ABSTRACT

A sheet forming apparatus includes a supply port for supplying a slurry, a discharge port for discharging a green sheet, a first slurry spreading chamber, a second slurry spreading chamber, and a third slurry spreading chamber that are disposed between the supply port and the discharge port, and joining holes through which the first, second, and third slurry spreading chambers are joined to each other. At least two of the joining holes are disposed one on each side of the supply port along a transverse direction of the green sheet.

12 Claims, 12 Drawing Sheets

10

SHEET FORMING APPARATUS FOR USE WITH DOCTOR BLADE

TECHNICAL FIELD

The present invention relates to a sheet forming apparatus for discharging a slurry into a sheet shape to produce a green sheet in combination with a doctor blade.

BACKGROUND ART

Generally, doctor blades are used to form green sheets having a small thickness and a large width from a slurry, which is a granular fluid, that is less viscous than a granular fluid for use in extrusion molding applications.

If a green sheet is formed from a slurry having a relatively high viscosity by a doctor blade, then the green sheet tends to have thickness irregularities along its transverse direction, particularly different thicknesses in the central region and opposite edge regions of the sheet along the transverse direction.

To solve the above problem, there has been proposed in the art a method of and an apparatus for manufacturing a green sheet as disclosed in Japanese Laid-Open Patent Publication No. 2007-190828. The disclosed method and apparatus make it possible to manufacture a wide green sheet of uniform thickness which is free of thickness irregularities along its transverse direction without the need for replacing a sheet material discharger such as a coating head or the like even when a slurry of different viscosity is used and also without the need for manually adjusting the opening of a nozzle of the coating head.

According to Japanese Laid-Open Patent Publication No. 2007-190828, as shown in FIG. 11 of the accompanying drawings, the thickness of a formed sheet 2 discharged from a nozzle opening 1*a* of a coating head 1 is measured by a plurality of thickness sensors 3 spaced along a transverse direction Y across the formed sheet 2. Based on thickness data of the formed sheet 2 which are measured by the thickness sensors 3 at a plurality of detecting positions spaced along the transverse direction Y, the flow rates of a slurry supplied to respective individual flow passages 1*c* connected to a slurry reservoir 1*b* disposed upstream of the nozzle opening 1*a* are controlled by respective control valves 5 that are controlled by a control means 4.

Specifically, if the thickness which is detected by one of the thickness sensors 3 is smaller than a reference value, then only the opening of the control valve 5 which is aligned with the detecting position of the thickness sensor 3 is controlled by the control means 4 to increase the flow rate of the slurry in the flow passage 1*c* that is controlled by the control valve 5. Conversely, if the thickness which is detected by one of the thickness sensors 3 is greater than the reference value, then only the opening of the control valve 5 which is aligned with the detecting position of the thickness sensor 3 is controlled by the control means 4 to reduce the flow rate of the slurry in the flow passage 1*c* that is controlled by the control valve 5.

As a result, the thickness of a portion of the formed sheet 2 at a certain position along the transverse direction Y is adjusted toward the reference value. In this manner, the formed sheet 2 is made uniform in thickness along the transverse direction Y.

The apparatus disclosed in Japanese Laid-Open Patent Publication No. 2007-190828 is complex in structure, is made up of a large number of parts, and hence is highly costly to manufacture because it includes the thickness sensors 3 and the control valves 5 for controlling the thickness of the formed sheet 2.

Japanese Laid-Open Patent Publication No. 10-329118 discloses a green sheet forming mold for forming a green sheet according to an extrusion molding process rather than a doctor blade process. The disclosed green sheet forming mold serves to reduce the difference between speeds at which a granular fluid flows in the central and central region and opposite edge regions of the mold, thereby minimizing thickness irregularities and density irregularities of a green sheet which is formed by the green sheet forming mold.

According to Japanese Laid-Open Patent Publication No. 10-329118, as shown in FIG. 12 of the accompanying drawings, a green sheet forming mold 6 for extrusion-molding a green sheet of a granular fluid includes a forming body 7 having a constant thickness through which the granular fluid flows. The forming body 7 has a pair of constricting side walls 8 on its transverse edges which are inclined or curved progressively inwardly toward the tip end of the green sheet forming mold 6.

The green sheet forming mold 6 disclosed in Japanese Laid-Open Patent Publication No. 10-329118 forms a thick narrow green sheet of a capillary according to an extrusion molding process. The disclosed concept is not applicable to a doctor blade process that forms a thin wide green sheet of a slurry which is lower in viscosity than a capillary.

SUMMARY OF INVENTION

It is an object of the present invention to provide a sheet forming apparatus for use with a doctor blade, which is capable of easily and reliably forming a green sheet having a uniform thickness of a slurry.

According to the present invention, there is provided a sheet forming apparatus for discharging a slurry into a sheet shape to produce a green sheet in combination with a doctor blade.

The sheet forming apparatus for use with a doctor blade comprises a supply port for supplying the slurry, a discharge port for discharging the green sheet, at least two slurry spreading chambers for spreading the slurry in a transverse direction of the green sheet which extends across a direction along which the green sheet is transported, the slurry spreading chambers being disposed between the supply port and the discharge port and arranged downstream along a direction in which the slurry flows from the supply port to the discharge port, and a plurality of joining holes through which adjacent ones of the slurry spreading chambers are joined to each other, wherein the joining holes include at least two joining holes disposed one on each side of the supply port along the transverse direction.

According to the present invention, the slurry which is supplied to an upstream one of slurry spreading chambers is supplied to a downstream one of the slurry spreading chambers through at least two joining holes which are disposed one on each side of the supply port in the transverse direction. Therefore, the slurry is spread along the transverse direction. The sheet forming apparatus can produce a green sheet of uniform thickness without being adversely affected by the materials of the green sheet, the viscosity of the slurry, the width of the green sheet, and the width setting of a clearance provided by the discharge port.

The slurry spreading chambers are effective to absorb slurry pulsations from a slurry supply for thereby supplying the slurry stably along the longitudinal direction of the green sheet. Consequently, the green sheet is uniformized in thickness along the longitudinal direction thereof, can be produced with an increased yield, and can be manufactured at a reduced cost.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
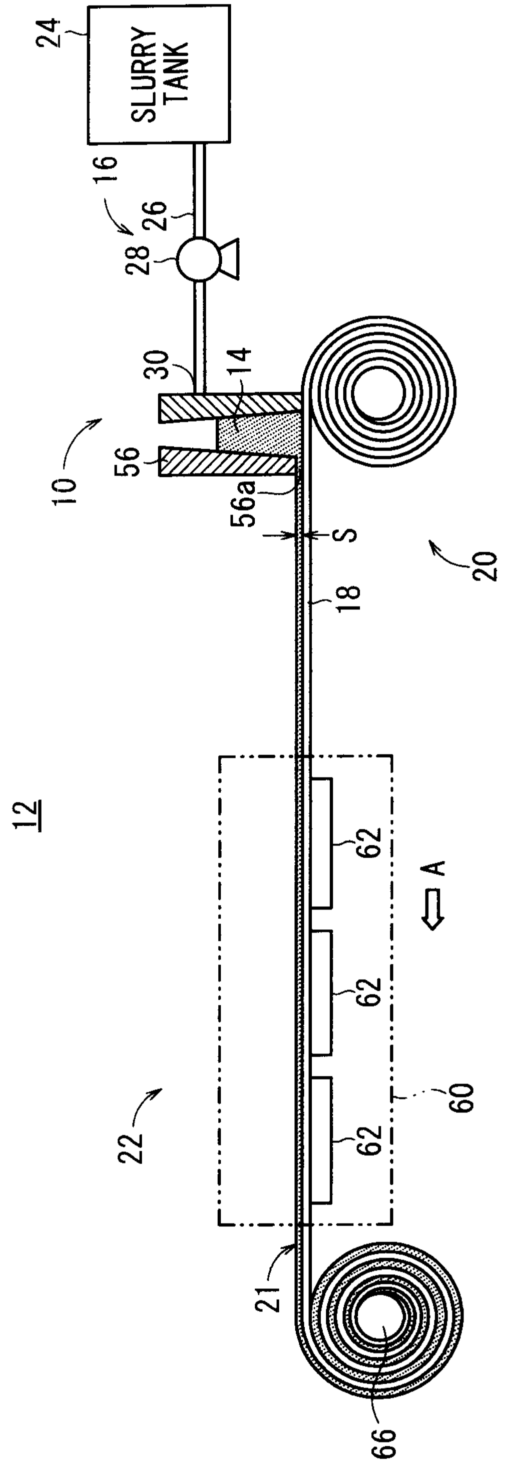
FIG. 1 is a side elevational view of a sheet manufacturing system incorporating a sheet forming apparatus for use with a doctor blade according to a first embodiment of the present invention.

As shown in FIG. 1, a sheet forming apparatus 10 for use with a doctor blade according to a first embodiment of the present invention is incorporated in a sheet manufacturing system 12.

The sheet manufacturing system 12 comprises a slurry supply 16 for supplying a slurry 14 to the sheet forming apparatus 10, a web supply 20 for supplying a web 18 to be coated with the slurry 14, and a drier 22 for drying a green sheet 21 which is produced when the web 18 is coated with the slurry 14. The sheet forming apparatus 10 is positioned above the web supply 20.

The slurry supply 16 includes a slurry tank 24 that is filled with the slurry 14 which is prepared by adding a binder to a powder of a raw material. The raw material may be YSZ+NiO+C, YSZ+NiO, YSZ, SSZ, NiO, SDC, GDC, LC, or LSC.

The slurry supply 16 also includes a slurry supply pipe 26 having an end connected to the slurry tank 24. The other end of the slurry supply pipe 26 is connected through a pump 28 to a supply port 30 of the sheet forming apparatus 10.

Figure 2:
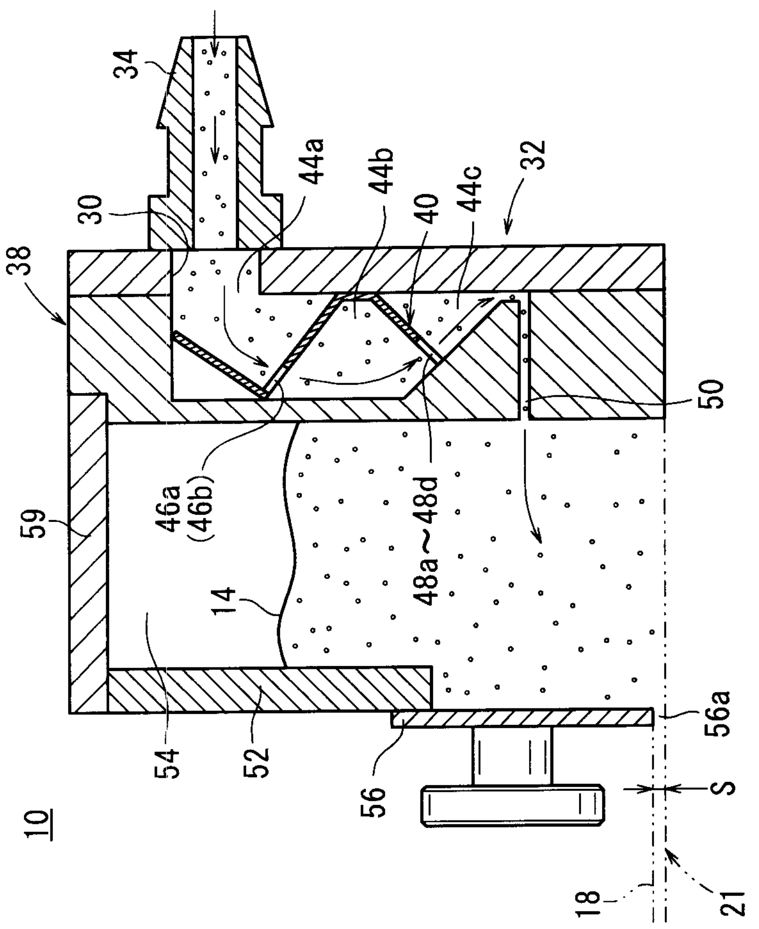
FIG. 2 is an enlarged cross-sectional view of the sheet forming apparatus according to the first embodiment.
Figure 3:
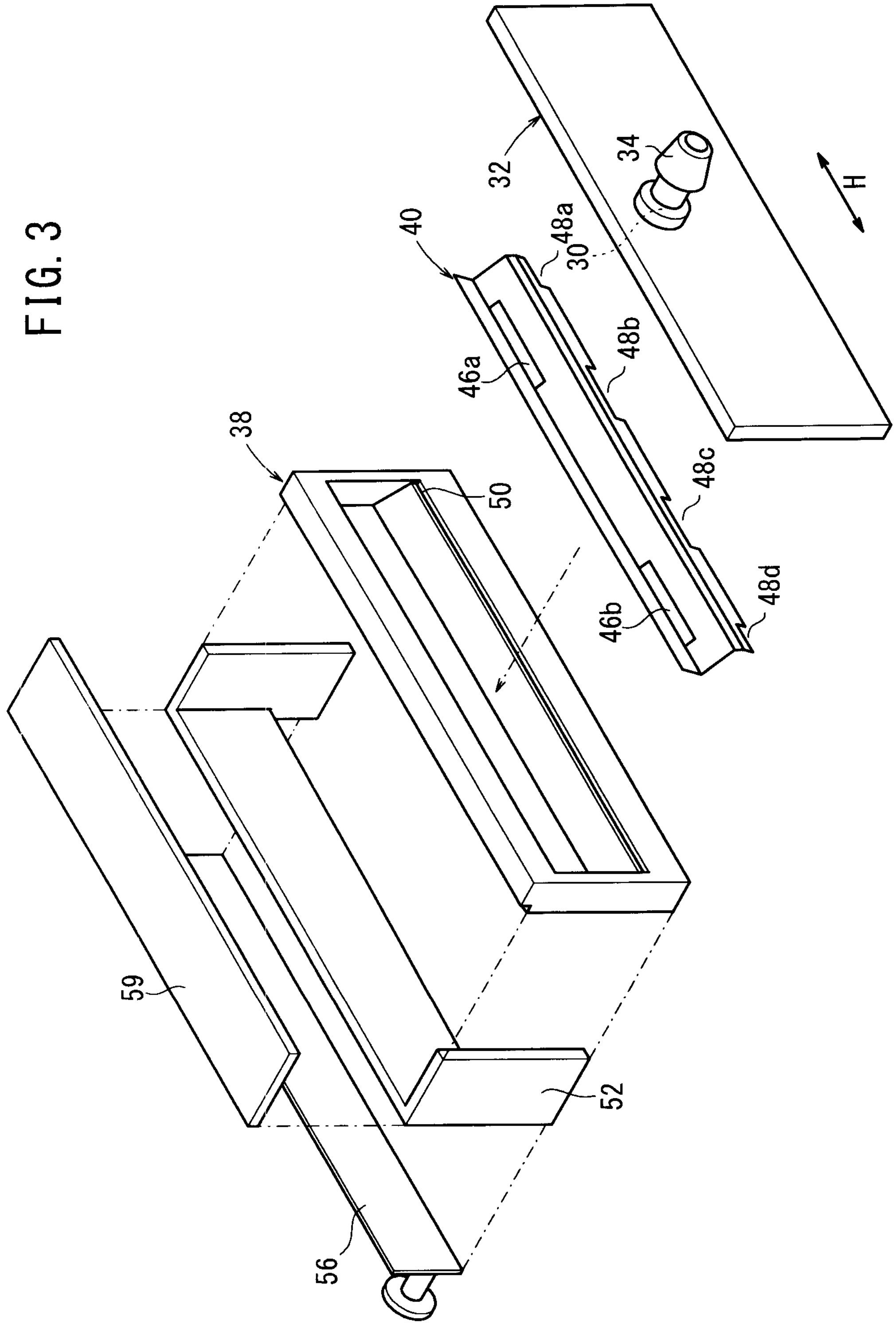
FIG. 3 is an exploded perspective view of the sheet forming apparatus according to the first embodiment.

As shown in FIGS. 2 and 3, the sheet forming apparatus 10 includes a supply box shield plate 32 in which the supply port 30 is defined. A nozzle 34 is mounted on the supply port 30. The sheet forming apparatus 10 also includes a supply box 38 mounted on the supply box shield plate 32 with a partition 40 interposed between the supply box shield plate 32 and the supply box 38 (see FIGS. 2 and 4).

As shown in FIG. 2, the sheet forming apparatus 10 has at least two slurry spreading chambers. Specifically, a first slurry spreading chamber **44*a* connected to the supply port 30, a second slurry spreading chamber 44*b*, and a third slurry spreading chamber 44*c* are defined between the supply box shield plate 32 and the supply box 38 by the partition 40. The partition 40** is formed by bending a single plate to shape.

The partition 40 has a plurality of joining holes, e.g., two joining holes **46*a*, 46*b*, defined therein through which the first slurry spreading chamber 44*a* and the second slurry spreading chamber 44*b* are joined to each other, and a plurality of joining holes, e.g., four joining holes 48*a*, 48*b*, 48*c*, 48*d* defined therein through which the second slurry spreading chamber 44*b* and the third slurry spreading chamber 44*c*** are joined to each other.

Figure 4:
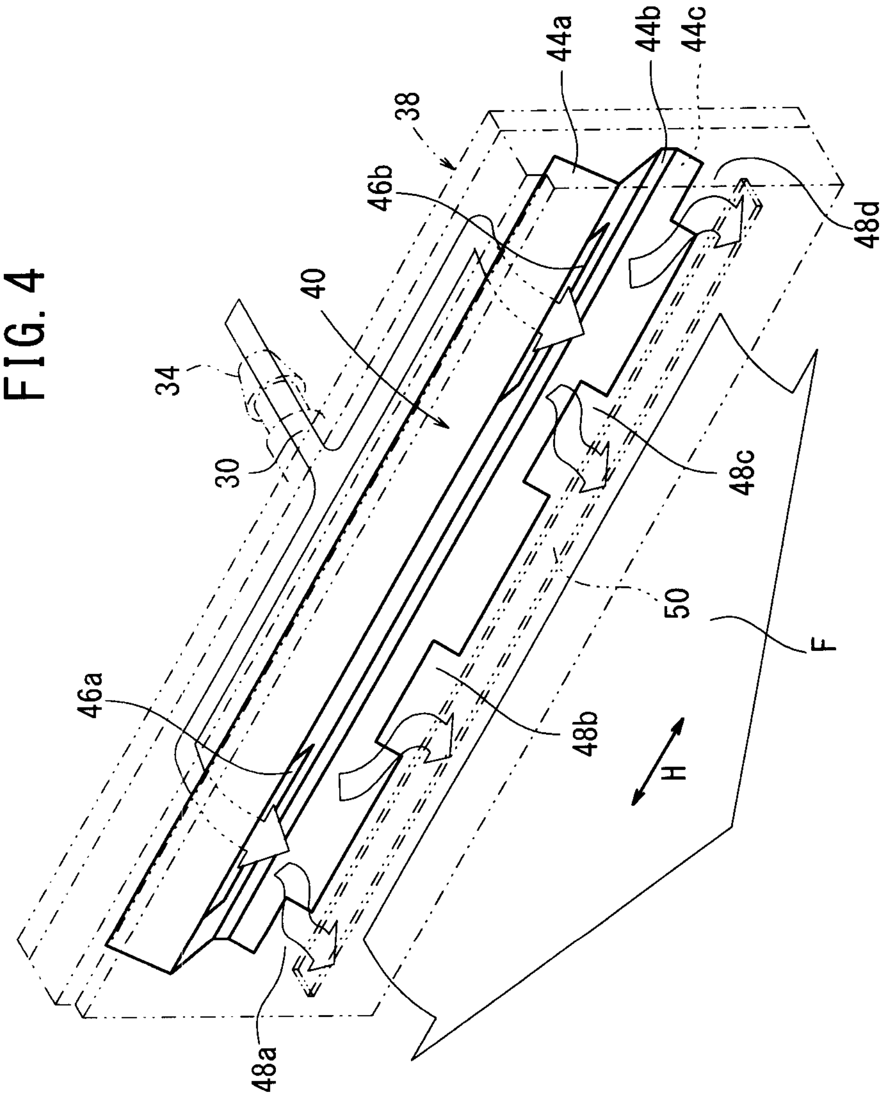
FIG. 4 is a perspective view of the sheet forming apparatus according to the first embodiment.

FIG. 4 shows the partition 40 in perspective. The joining holes **46*a*, 46*b*, which are positioned in an upstream region with respect to the direction, indicated by the arrow F, along which the slurry flows from the supply port 30 into the sheet forming apparatus 10, are disposed one on each side of the supply port 30 in the transverse direction, indicated by the arrow H, of the green sheet 21. The joining holes 48*a*, 48*b*, 48*c*, 48*d*, which are positioned in a downstream region with respect to the direction F, are greater in number than the joining holes 46*a*, 46*b* and spread in a wider range than the joining holes 46*a*, 46*b*** along the transverse direction H.

The joining holes **48*a*, 48*b*, 48*c*, 48*d* provide respective fluid passages having cross-sectional areas, the sum of which is smaller than the sum of cross-sectional areas of respective fluid passages provided by the joining holes 46*a*, 46*b*. The number of the joining holes 48*a*, 48*b*, 48*c*, 48*d* is twice (n times) the number of the joining holes 46*a*, 46*b*. Adjacent ones of the joining holes 48*a*, 48*b*, 48*c*, 48*d* are spaced a constant distance 1 from each other along the transverse direction H (see FIG. 5**).

As shown in FIG. 2, the supply box 38 has a channel 50 defined therein which has an entrance end that is open into the third slurry spreading chamber **44*c*. The sheet forming apparatus 10 includes a slurry reservoir case 52 defining therein a slurry reservoir chamber 54 into which the exit end of the channel 50 is open. A blade 56 is mounted on the slurry reservoir case 52**.

The slurry reservoir chamber 54 has an upper end closed off by a plate 59 for preventing the slurry 14, supplied from the channel 50 into the slurry reservoir chamber 54, from being dried. The blade 56 has a lower end spaced upwardly from the web 18 supplied from the web supply 20, defining a discharge port **56*a* between the lower end of the blade 56 and the web 18** and providing a clearance S therebetween.

The total cross-sectional area of the supply port 30 is greater than the total cross-sectional area of the discharge port **56*a*. The sum of the cross-sectional areas of the fluid passages of the joining holes 48*a*, 48*b*, 48*c*, 48*d* is greater than the total cross-sectional area of the discharge port 56*a*. The total cross-sectional area of the supply port 30 is greater than the sum of the cross-sectional areas of the fluid passages of the joining holes 46*a*, 46*b*. The supply port 30 is disposed upwardly of the discharge port 56*a***.

As shown in FIG. 1, the drier 22 is disposed downstream of the web supply 20 and the sheet forming apparatus 10 with respect to the direction, indicated by A, along which the web 18 travels through the drier 22. The drier 22 includes a drying booth 60 housing therein a plurality of heaters 62 disposed beneath the web 18 which is supplied from the web supply 20. After the green sheet 21 is dried by the drier 22, it is wound around a takeup shaft 66 that is disposed downstream of the drier 22.

Operation of the sheet manufacturing system 12 will be described below in relation to the sheet forming apparatus 10.

As shown in FIG. 1, the pump 28 of the slurry supply 16 is actuated to supply the slurry 14 contained in the slurry tank 24 through the slurry supply pipe 26 to the supply port 30 of the sheet forming apparatus 10. In the sheet forming apparatus 10, as shown in FIG. 2, the slurry 14 is supplied from the supply port 30 into the first slurry spreading chamber 44*a*.

Figure 5:
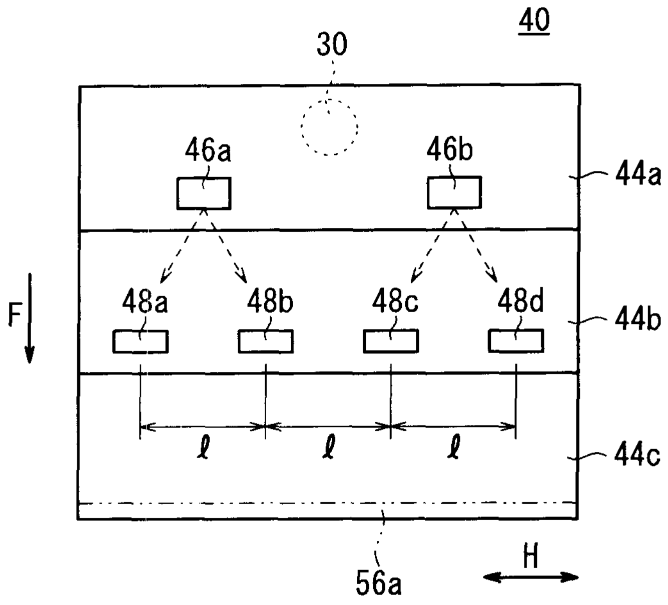
FIG. 5 is a view showing joining holes defined in a partition of the sheet forming apparatus according to the first embodiment.

As shown in FIGS. 4 and 5, the two joining holes 46*a*, 46*b* which are defined in the partition 40 are spaced from each other along the transverse direction H and are open into the first slurry spreading chamber 44*a* and the second slurry spreading chamber 44*b*. The slurry 14 which has entered the first slurry spreading chamber 44*a* flows through the joining ports 46*a*, 46*b* into the second slurry spreading chamber 44*b*. The joining holes 48*a*, 48*b*, 48*b*, 48*c* which are defined in the partition 40 are open into the second slurry spreading chamber 44*b* and the third slurry spreading chamber 44*c*. The slurry 14 which has entered the second slurry spreading chamber 44*b* flows into the third slurry spreading chamber 44*c*.

The slurry 14 which has entered the third slurry spreading chamber 44*c* then flows through the channel 50 into the slurry reservoir chamber 54, and is placed on the web 18 supplied from the web supply 20. The web supply 20 is actuated to move the web 18 in the direction A shown in FIG. 1.

As the web 18 is traveling in the direction A, the slurry 14 is continuously applied to the web 18 to a height in the thicknesswise direction of the web 18 through the discharge port 56*a* defined by the lower end of the blade 56. The web 18 which is coated with the slurry 14, i.e., the green sheet 21, is then carried into the drier 22. The green sheet 21 is dried by the heaters 62 housed in the drying booth 60, and then wound around the takeup shaft 66.

According to the first embodiment, the slurry 14 which is supplied to the first slurry spreading chamber 44*a* is supplied to the second slurry spreading chamber 44*b* through the joining holes 46*a*, 46*b* are disposed one on each side of the supply port 30 in the transverse direction H. The slurry 14 which is supplied to the second slurry spreading chamber 44*b* is supplied to the third slurry spreading chamber 44*c* through the joining holes 48*a*, 48*b*, 48*c*, 48*d* which are greater in number than the joining holes 46*a*, 46*b* and spread in a wider range than the joining holes 46*a*, 46*b* along the transverse direction H, so that the slurry 14 is spread along the transverse direction H as the slurry 14 enters the third slurry spreading chamber 44*c*.

Since the slurry 14 is spread along the transverse direction H as it goes out of the discharge port 56*a*, the sheet forming apparatus 10 can produce a green sheet 21 of uniform thickness without being adversely affected by the materials of the green sheet 21, the viscosity of the slurry 14, the width of the green sheet 21, and the width setting of the clearance S of the blade 56 provided by the discharge port 56*a*.

As described above, the sheet forming apparatus 10 has at least two slurry spreading chambers, e.g., the first slurry spreading chamber 44*a*, the second slurry spreading chamber 44*b*, and the third slurry spreading chamber 44*c*. These slurry spreading chambers are effective to absorb slurry pulsations from the slurry supply 16, i.e., slurry pulsations produced by the pump 28, for thereby supplying the slurry 14 stably along the longitudinal direction of the green sheet 21, i.e., along the direction A. Consequently, the green sheet 21 is uniformized in thickness along the longitudinal direction thereof, can be produced with an increased yield, and can be manufactured at a reduced cost.

Furthermore, as described above, the sum of the cross-sectional areas of the fluid passages provided by the joining holes 48*a*, 48*b*, 48*c*, 48*d* is smaller than the sum of the cross-sectional areas of the fluid passages provided by the joining holes 46*a*, 46*b*. Therefore, the slurry 14 supplied to the first slurry spreading chamber 44*a* is reliably prevented from flowing into the second slurry spreading chamber 44*b* before it is spread along the transverse direction H of the green sheet 21.

Consequently, the sheet forming apparatus 10 can reliably produce a green sheet 21 of uniform thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the number of the joining holes 48*a*, 48*b*, 48*c*, 48*d* is twice the number of the joining holes 46*a*, 46*b*. Therefore, as the slurry 14 flows downstream successively through the first slurry spreading chamber 44*a*, the second slurry spreading chamber 44*b*, and the third slurry spreading chamber 44*c*, the slurry 14 is spread along the transverse direction H of the green sheet 21. The green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the total cross-sectional area of the supply port 30 is greater than the total cross-sectional area of the discharge port 56*a*. Therefore, the slurry 14 supplied to an upstream chamber, e.g., the second slurry spreading chamber 44*b*, is effectively prevented from flowing into the third slurry spreading chamber 44*c*, which is located downstream of the second slurry spreading chamber 44*b*, before the slurry 14 is spread along the transverse direction H. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the sum of the cross-sectional areas of the fluid passages of the joining holes 48*a*, 48*b*, 48*c*, 48*d* is greater than the total cross-sectional area of the discharge port 56*a*. Therefore, the slurry 14 supplied to the third slurry spreading chamber 44*c*, which is the most downstream chamber, is effectively prevented from being discharged out of the discharge port 56*a* before the slurry 14 is spread along the transverse direction H. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the total cross-sectional area of the supply port 30 is greater than the sum of the cross-sectional areas of the fluid passages of the most upstream joining holes 46*a*, 46*b*. The slurry 14 supplied to the first slurry spreading chamber 44*a*, which is the most upstream chamber, is effectively prevented from suffering a shortage from the supply port 30 before the slurry 14 is spread along the transverse direction H. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the supply port 30 is disposed upwardly of the discharge port 56*a*. Therefore, the slurry 14 is smoothly and effectively spread along the transverse direction H by gravity as it flows downwardly from the supply port 30. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

As described above, the joining holes 48*a*, 48*b*, 48*c*, 48*d* which are arranged along the transverse direction H and are open into the second slurry spreading chamber 44*b* and the third slurry spreading chamber 44*c* are spaced the constant distance 1 from each other along the transverse direction H. Therefore, the slurry 14 is uniformly spread along the transverse direction H as it flows downstream from the second slurry spreading chamber 44*b* into the third slurry spreading chamber 44*c*. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

The joining holes 46*a*, 46*b* and the joining holes 48*a*, 48*b*, 48*c*, 48*d* are defined in the single partition 40, and the single partition 40 defines the first slurry spreading chamber 44*a*, the second slurry spreading chamber 44*b*, and the third slurry spreading chamber 44*c* between the supply box shield plate 32 and the supply box 38. Consequently, the slurry 14 is highly effectively spread along the transverse direction H by the simple and economical structure. Accordingly, the green sheet 21 which is produced by the sheet forming apparatus 10 is thus uniformized in thickness without being adversely affected by the materials of the green sheet 21, the viscosity of the slurry 14, the width of the green sheet 21, and the width setting of the clearance S of the blade 56 provided by the discharge port 56*a*. As a result, the green sheet 21 can be produced with an increased yield and can be manufactured at a reduced cost.

Figure 6:
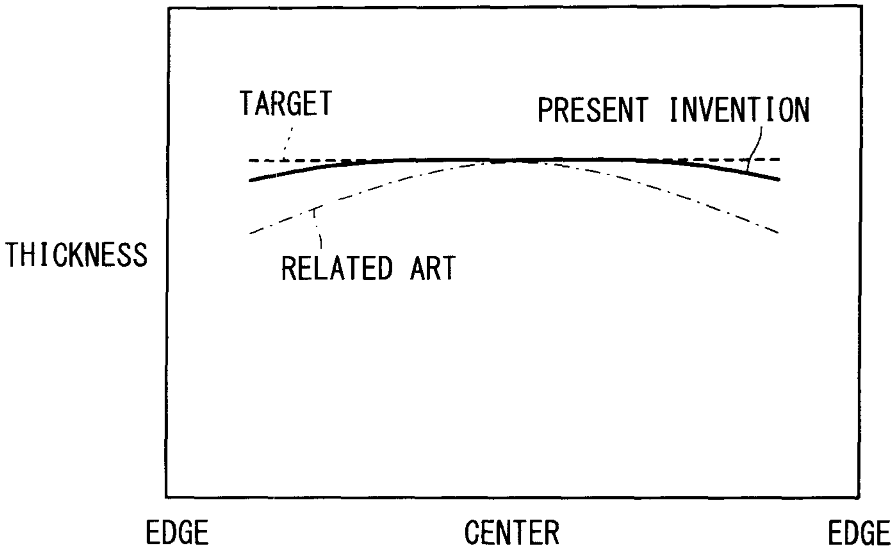
FIG. 6 is a diagram illustrative of the thickness of a green sheet formed by the sheet forming apparatus according to the present invention and the thickness of a green sheet formed by a sheet forming apparatus according to the related art.

FIG. 6 is a diagram illustrative of the thickness of the green sheet 21 formed by the sheet forming apparatus 10 according to the first embodiment of the present invention and the thickness of a green sheet formed by a sheet forming apparatus according to the related art. The sheet forming apparatus according to the related art is free of joining holes in a partition and supplies a slurry directly from a supply port to a discharge port. As shown in FIG. 6, the green sheet formed by the sheet forming apparatus according to the related art has its thickness at the opposite edge regions thereof considerably smaller than its thickness at the central region thereof. On the other hand, the green sheet 21 formed by the sheet forming apparatus 10 according to the first embodiment is substantially uniform in thickness along the transverse direction thereof.

Figure 7:
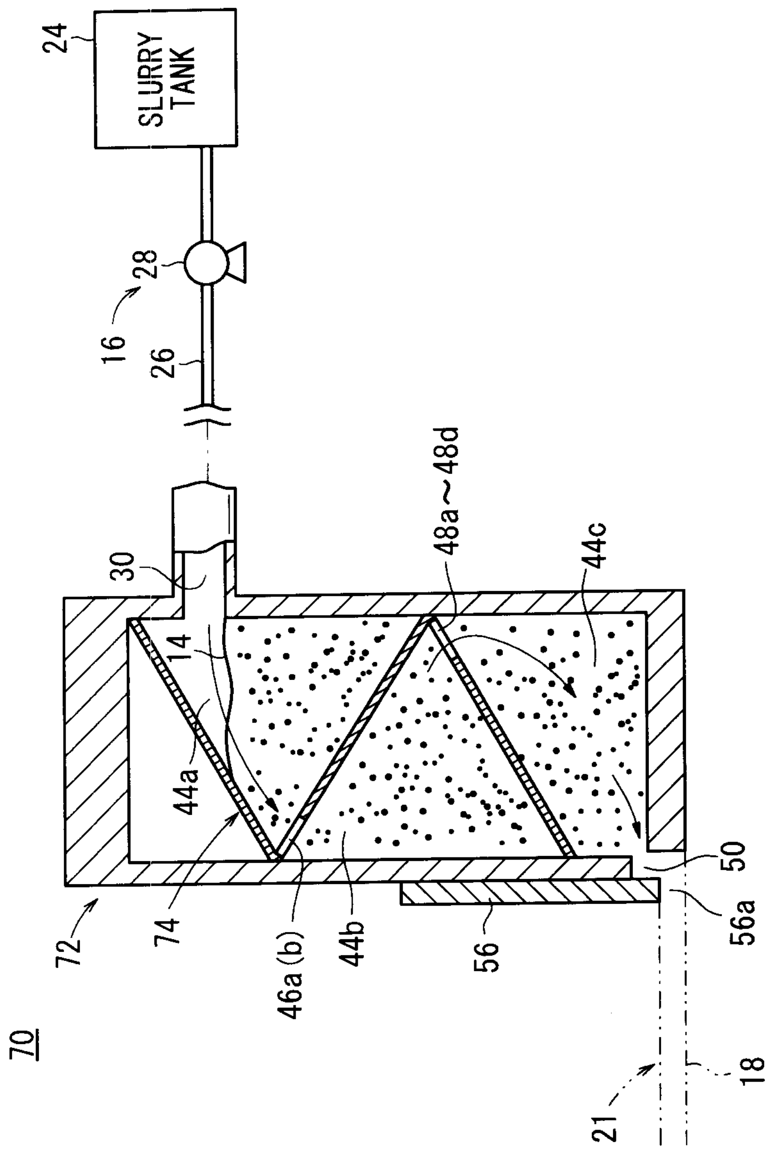
FIG. 7 is a cross-sectional view of a sheet forming apparatus for use with a doctor blade according to a second embodiment of the present invention.

FIG. 7 is a cross-sectional view of a sheet forming apparatus 70 for use with a doctor blade according to a second embodiment of the present invention.

Those parts of the sheet forming apparatus 70 which are identical to those of the sheet forming apparatus 10 according to the first embodiment are denoted by identical reference characters, and will not be described in detail below. This also applies to sheet forming apparatus according to third through fifth embodiments of the present invention to be described below.

As shown in FIG. 7, the sheet forming apparatus 70 includes a box-shaped casing 72 housing a partition 74 therein. The partition 74 defines a first slurry spreading chamber 44*a* connected to the supply port 30, a second slurry spreading chamber 44*b*, and a third slurry spreading chamber 44*c* in the casing 72. The partition 74 is formed by bending a single plate to shape.

The partition 74 has two joining holes 46*a*, 46*b* defined therein through which the first slurry spreading chamber 44*a* and the second slurry spreading chamber 44*b* are joined to each other, and four joining holes 48*a*, 48*b*, 48*c*, 48*d* (twice the joining holes 46*a*, 46*b*) defined therein through which the second slurry spreading chamber 44*b* and the third slurry spreading chamber 44*c* are joined to each other.

The casing 72 has an channel 50 defined in a lower corner thereof. The channel 50 is open into the third slurry spreading chamber 44*c*. A blade 56 is mounted on the casing 72 and has a lower end spaced upwardly from the web 18, defining a discharge port 56*a* between the lower end of the blade 56 and the web 18.

According to the second embodiment, the third slurry spreading chamber 44*c* functions as the slurry reservoir chamber 54 according to the first embodiment. The other structural details of the sheet forming apparatus 70 according to the second embodiment are the same as those of the sheet forming apparatus 10 according to the first embodiment. The sheet forming apparatus 70 according to the second embodiment offers the same advantages as those of the sheet forming apparatus 10 according to the first embodiment.

Figure 8:
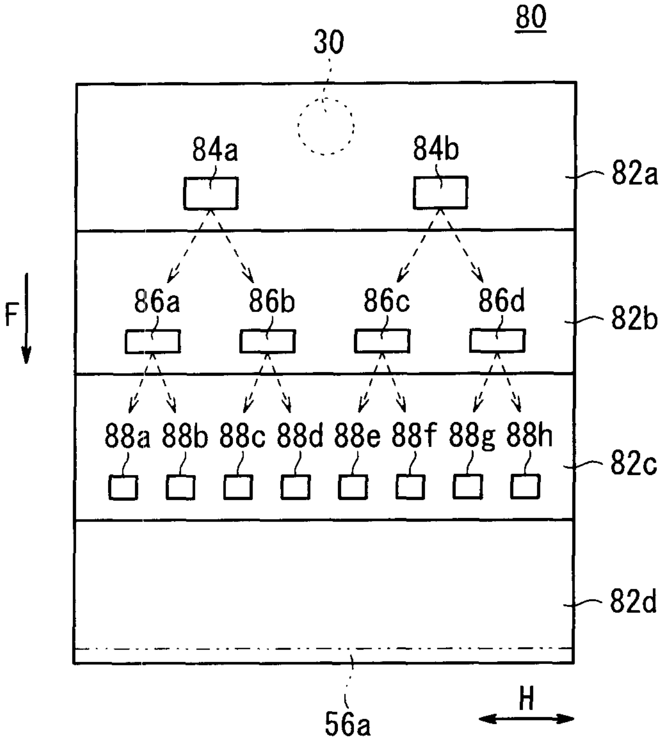
FIG. 8 is a view showing joining holes defined in a partition of a sheet forming apparatus for use with a doctor blade according to a third embodiment of the present invention.

FIG. 8 is a view showing joining holes defined in a partition 80 of a sheet forming apparatus for use with a doctor blade according to a third embodiment of the present invention.

As shown in FIG. 8, the sheet forming apparatus according to the third embodiment has a first slurry spreading chamber 82*a*, a second slurry spreading chamber 82*b*, a third slurry spreading chamber 82*c*, and a fourth slurry spreading chamber 82*d* which are defined between the supply port 30 and the discharge port 56*a* by the partition 80. The partition 80 has two joining holes 84*a*, 84*b* defined therein through which the first slurry spreading chamber 82*a* and the second slurry spreading chamber 82*b* are joined to each other, four joining holes 86*a*, 86*b*, 86*c*, 86*d* (twice the joining holes 84*a*, 84*b*) defined therein through which the second slurry spreading chamber 82*b* and the third slurry spreading chamber 82*c* are joined to each other, and eight joining holes 88*a*, 88*b*, 88*c*, 88*d*, 88*e*, 88*f*, 88*g*, 88*h* (twice the joining holes 86*a*, 86*b*, 86*c*, 86*d*) defined therein through which the third slurry spreading chamber 82*c* and the fourth slurry spreading chamber 82*d* are joined to each other.

The relationship between the joining holes 84*a*, 84*b* and the joining holes 86*a*, 86*b*, 86*c*, 86*d* is the same as the relationship between the joining holes 46, 46*b* and joining holes 48*a*, 48*b*, 48*c*, 48*d* according to the first embodiment. The joining holes 88*a*, 88*b*, 88*c*, 88*d*, 88*e*, 88*f*, 88*g*, 88*h* are greater in number than (twice) the joining holes 86*a*, 86*b*, 86*c*, 86*d* and spread in a wider range along the transverse direction H than the joining holes 86*a*, 86*b*, 86*c*, 86*d*.

The sum of the cross-sectional areas of fluid passages provided respectively by the joining holes 88*a*, 88*b*, 88*c*, 88*d*, 88*e*, 88*f*, 88*g*, 88*h* is smaller than the sum of the cross-sectional areas of fluid passages provided respectively by the joining holes 86*a*, 86*b*, 86*c*, 86*d*. Adjacent ones of the joining holes 86*a*, 86*b*, 86*c*, 86*d* are spaced a constant distance from each other along the transverse direction H, and adjacent ones of the joining holes 88*a*, 88*b*, 88*c*, 88*d*, 88*e*, 88*f*, 88*g*, 88*h* are spaced a constant distance from each other along the transverse direction H.

According to the third embodiment, the sheet forming apparatus has four slurry spreading chambers, i.e., the first slurry spreading chamber 82*a*, the second slurry spreading chamber 82*b*, the third slurry spreading chamber 82*c*, and the fourth slurry spreading chamber 82*d*, and the partition 80 has the joining holes 88*a*, 88*b*, 88*c*, 88*d*, 88*e*, 88*f*, 88*g*, 88*h* which are open into the third slurry spreading chamber 82*c* and the fourth slurry spreading chamber 82*d*.

The joining holes in the three sets are successively twofold in number from upstream to downstream. The sheet forming apparatus according to the third embodiment offers the same advantages as those of the sheet forming apparatus 10 according to the first embodiment and the sheet forming apparatus 70 according to the second embodiment.

Figure 9:
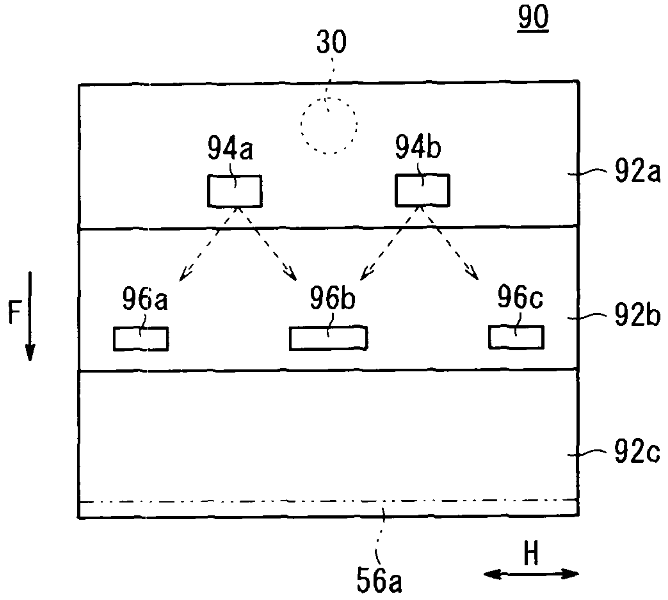
FIG. 9 is a view showing joining holes defined in a partition of a sheet forming apparatus for use with a doctor blade according to a fourth embodiment of the present invention.

FIG. 9 is a view showing joining holes defined in a partition 90 of a sheet forming apparatus for use with a doctor blade according to a fourth embodiment of the present invention.

As shown in FIG. 9, the sheet forming apparatus according to the fourth embodiment includes a first slurry spreading chamber 92*a*, a second slurry spreading chamber 92*b*, and a third slurry spreading chamber 92*c* which are defined by the partition 90 and arranged successively downstream from the supply port 30 to the discharge port 56*a*. The partition 90 has two joining holes 94*a*, 94*b* defined therein through which the first slurry spreading chamber 92*a* and the second slurry spreading chamber 92*b* are joined to each other, and three joining holes 96*a*, 96*b*, 96*c* defined therein through which the second slurry spreading chamber 92*b* and the third slurry spreading chamber 92*c* are joined to each other. The joining hole 96*b*, which is positioned between the joining holes 96*a*, 96*c*, is wider than the joining holes 96*a*, 96*c*. The joining hole 96*b* is wider than the joining holes 96*a*, 96*c* because it is supplied with the slurry 14 from both the joining holes 94*a*, 94*b* that are positioned upstream of the joining hole 96*b*.

According to the fourth embodiment, the joining holes 94*a*, 94*b* are disposed one on each side of the supply port 30 in the transverse direction H, and the number of joining holes 96*a*, 96*b*, 96*c* is equal to (the number of joining holes 94*a*, 94*b*+1). The joining holes 96*a*, 96*b*, 96*c* are spread in a wider range along the transverse direction H than the joining holes 94*a*, 94*b*. The sheet forming apparatus according to the fourth embodiment offers the same advantages as those of the sheet forming apparatus 10 according to the first embodiment and the sheet forming apparatus 70 according to the second embodiment.

Figure 10:
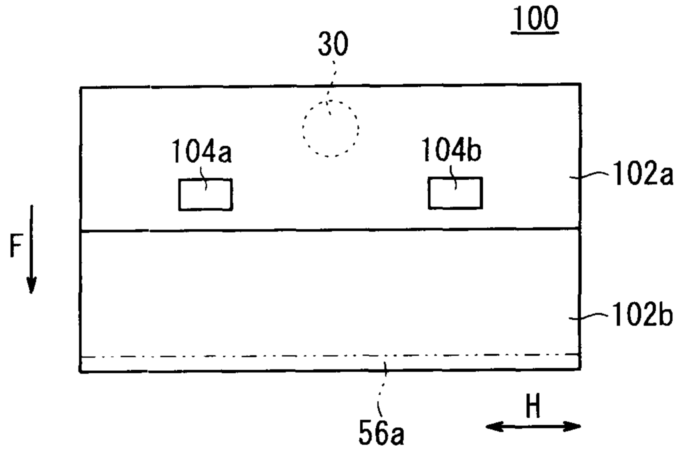
FIG. 10 is a view showing joining holes defined in a partition of a sheet forming apparatus for use with a doctor blade according to a fifth embodiment of the present invention.
Figure 11:
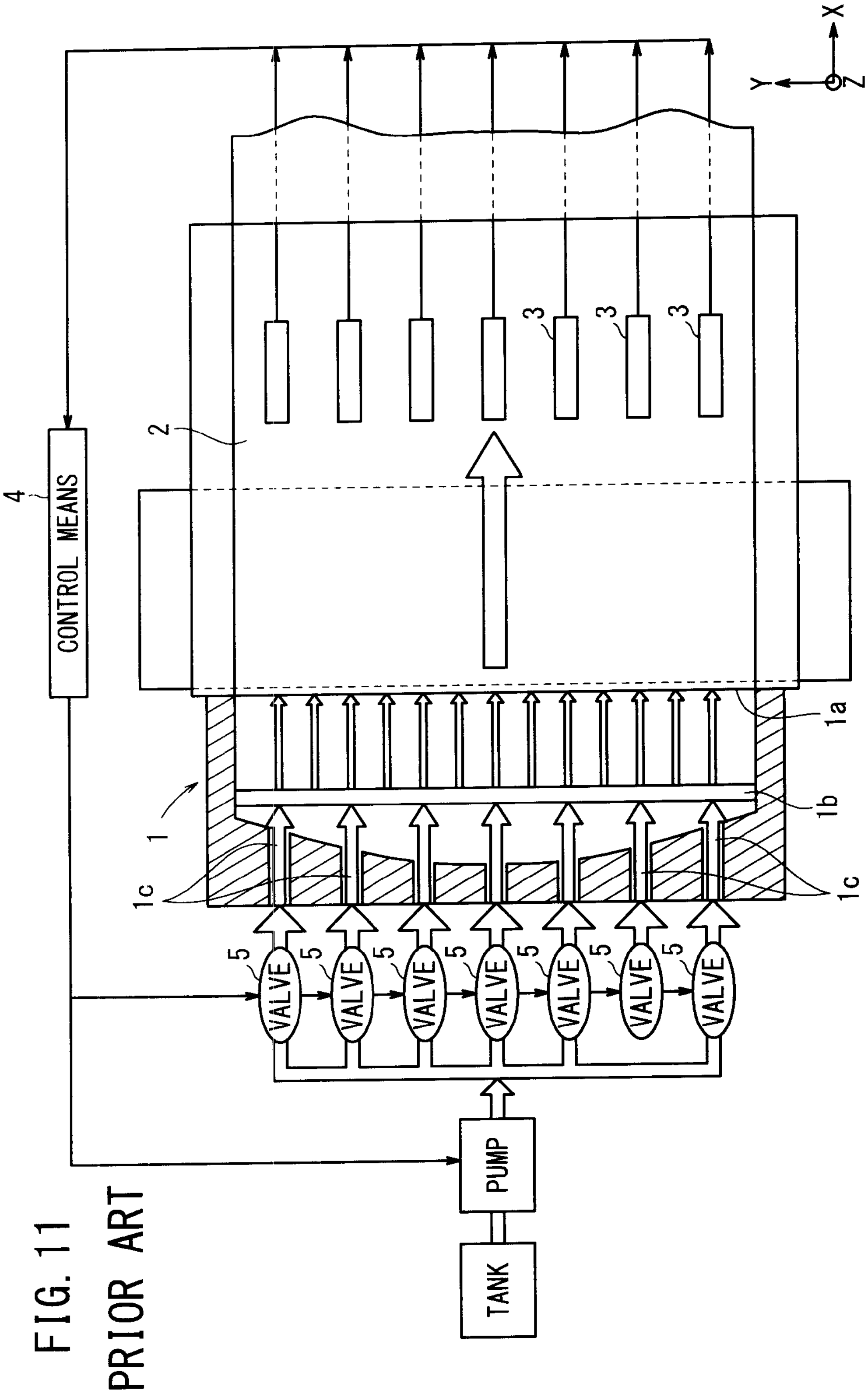
FIG. 11 PRIOR ART
FIG. 11 is a plan view of an apparatus for manufacturing a green sheet disclosed in Japanese Laid-Open Patent Publication No. 2007-190828.
Figure 12:
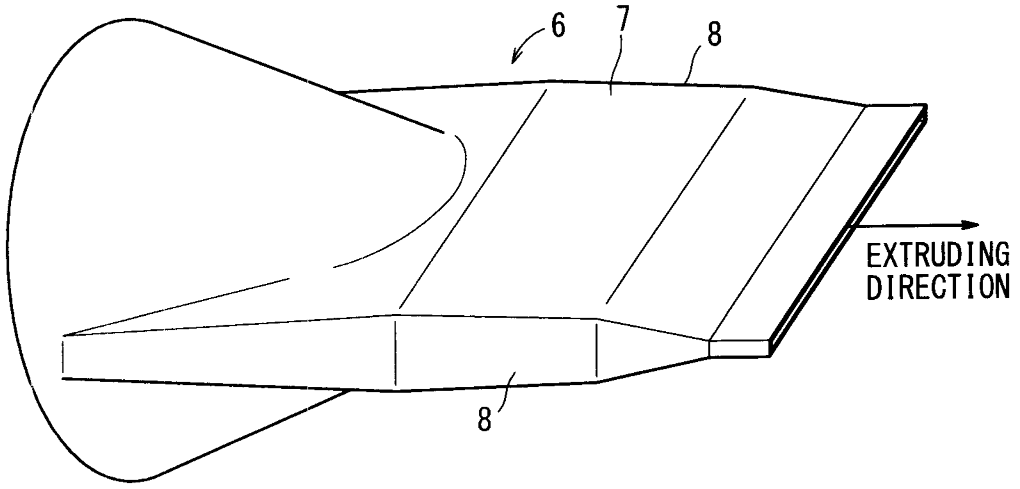
FIG. 12 PRIOR ART
FIG. 12 is a perspective view of a green sheet forming mold disclosed in Japanese Laid-Open Patent Publication No. 10-329118.

FIG. 10 is a view showing joining holes defined in a partition 100 of a sheet forming apparatus for use with a doctor blade according to a fifth embodiment of the present invention.

As shown in FIG. 10, the sheet forming apparatus according to the fifth embodiment includes a first slurry spreading chamber 102*a* and a second slurry spreading chamber 102*b* which are arranged successively downstream from the supply port 30 to the discharge port 56*a*. The first slurry spreading chamber 102*a* and the second slurry spreading chamber 102*b* are joined to each other through two joining holes 104*a*, 104*b* defined in the partition 100. The joining holes 104*a*, 104*b* are disposed one on each side of the supply port 30 in the transverse direction H.

According to the fifth embodiment, the slurry 14 which is supplied from the supply port 30 to the first slurry spreading chamber 102*a* is spread and supplied through the joining holes 104*a*, 104*b* to the second slurry spreading chamber 102*b* which is disposed downstream of the first slurry spreading chamber 102*a*. The slurry 14 is thus highly effectively spread along the transverse direction H to produce a green sheet of uniform thickness. The sheet forming apparatus according to the fifth embodiment offers the same advantages as those of the sheet forming apparatus 10 according to the first embodiment and the sheet forming apparatus 70 according to the second embodiment.

Although certain preferred embodiments of the present invention have been shown and described in detail, it should be understood that various changes and modifications may be made therein without departing from the scope of the appended claims.

The invention claimed is:

1. A sheet forming apparatus for discharging a slurry into a sheet shape to produce a green sheet in combination with a doctor blade, comprising:

a supply port configured to supply the slurry;

a discharge port configured to discharge the green sheet;

a plurality of slurry spreading chambers configured to spread the slurry in a transverse direction of the green sheet which extends across a direction along which the green sheet is transported, the slurry spreading chambers being disposed between the supply port and the discharge port and arranged downstream along a direction in which the slurry flows from the supply port to the discharge port; and a plurality of joining holes through which adjacent ones of the slurry spreading chambers are joined to each other;

wherein the joining holes include at least two joining holes, with one joining hole disposed on each side of the supply port along the transverse direction, wherein the joining holes include a plurality of sets of joining holes, each set of joining holes joining one of the plurality of slurry spreading chambers to an adjacent one of the plurality of slurry spreading chambers, wherein each of the plurality of sets of joining holes includes at least one joining hole, and wherein each of the joining holes provides a fluid passage having a cross-sectional area, and a sum of cross-sectional areas of each set of joining holes is smaller than a sum of cross-sectional areas of each other set of joining holes disposed upstream therefrom along the direction in which the slurry flows from the supply port to the discharge port.

2. The sheet forming apparatus according to claim 1, wherein the plurality of slurry spreading chambers includes a first slurry spreading chamber, a second slurry spreading chamber disposed downstream from the first slurry spreading chamber, and a third slurry spreading chamber disposed downstream from the second slurry spreading chamber, and the plurality of sets of joining holes include an upstream set of joining holes joining the first slurry spreading chamber to the second slurry spreading chamber, and a downstream set of joining holes joining the second slurry spreading chamber to the third slurry spreading chamber, the downstream set of joining holes including a greater number of joining holes than the upstream set of joining holes, and the joining holes of the downstream set of joining holes being spread in a wider range than the joining holes of the upstream set of joining holes.

3. The sheet forming apparatus according to claim 2, wherein a sum of the cross-sectional areas of the joining holes of the downstream set of joining holes is smaller than a sum of the cross-sectional areas of the joining holes of the upstream set of joining holes.

4. The sheet forming apparatus according to claim 1, wherein for all sets of joining holes other than an upstream most set of joining holes along the direction in which the slurry flows from the supply port to the discharge port, the number of the joining holes in the set of joining holes is n times (n represents an integer of at least 2) greater than the number of joining holes in the set of joining holes disposed immediately upstream therefrom along the direction in which the slurry flows from the supply port to the discharge port.

5. The sheet forming apparatus according to claim 1, wherein a total cross-sectional area of the supply port is greater than a total cross-sectional area of the discharge port.

6. The sheet forming apparatus according to claim 1, wherein the plurality of sets of joining holes include a most downstream set of joining holes which provide fluid passages having respective cross-sectional areas, the sum of the cross-sectional areas of joining holes of the most downstream set of joining holes being greater than a total cross-sectional area of the discharge port.

7. A sheet forming apparatus for discharging a slurry into a sheet shape to produce a green sheet in combination with a doctor blade, comprising:

a supply port configured to supply the slurry;

a discharge port configured to discharge the green sheet;

at least two slurry spreading chambers configured to spread the slurry in a transverse direction of the green sheet which extends across a direction along which the green sheet is transported, the slurry spreading chambers being disposed between the supply port and the discharge port and arranged downstream along a direction in which the slurry flows from the supply port to the discharge port; and a plurality of joining holes through which adjacent ones of the slurry spreading chambers are joined to each other;

wherein the joining holes include at least two joining holes, with one joining hole disposed on each side of the supply port along the transverse direction, and wherein the joining holes include a most upstream set of joining holes which provide fluid passages having respective cross-sectional areas feeding from a most upstream slurry spreading chamber, and a total cross-sectional area of the supply port is greater than a sum of the cross-sectional areas of the most upstream set of joining holes.

8. The sheet forming apparatus according to claim 1, wherein the supply port is disposed upwardly of the discharge port.

9. The sheet forming apparatus according to claim 1, wherein the joining holes include at least three joining holes disposed along the transverse direction and being open into one of at least two slurry spreading chambers, and adjacent ones of the at least three joining holes are spaced a constant distance from each other along the transverse direction.

10. The sheet forming apparatus according to claim 1, further comprising:

a single partition, the joining holes being defined in the single partition;

the plurality of slurry spreading chambers being defined by the single partition.

11. A sheet forming apparatus for discharging a slurry into a sheet shape to produce a green sheet in combination with a doctor blade, comprising:

a supply port configured to supply the slurry;

a discharge port configured to discharge the green sheet;

first, second, and third slurry spreading chambers configured to spread the slurry in a transverse direction of the green sheet which extends across a direction along which the green sheet is transported, the first, second, and third slurry spreading chambers being disposed between the supply port and the discharge port and arranged downstream along a direction in which the slurry flows from the supply port to the discharge port, the third slurry spreading chamber being downstream from the second slurry spreading chamber along the direction in which the slurry flows from the supply port to the discharge port, and the second slurry spreading chamber being downstream from the first slurry spreading chamber along the direction in which the slurry flows from the supply port to the discharge port;

a first partition portion separating the first slurry spreading chamber from the second slurry spreading chamber, and a second partition portion separating the second slurry spreading chamber from the third slurry spreading chamber; and a first set of joining holes including a plurality of first joining holes defined through the first partition portion and joining the first slurry spreading chamber and the second slurry spreading chamber, and a second set of joining holes including a plurality of second joining holes defined through the second partition portion and joining the second slurry spreading chamber and the third slurry spreading chamber, wherein the plurality of first joining holes and the plurality of second joining holes include at least one joining hole disposed on each side of the supply port along the transverse direction, wherein each of the plurality of first joining holes provide a fluid passage having a first cross-sectional area, each of the plurality of second joining holes provide a fluid passage having a second cross-sectional area, and a sum of the first cross-sectional areas of all of the plurality of first joining holes of the first set of joining holes is greater than a sum of the second cross-sectional areas of all of the plurality of second joining holes of the second set of joining holes.

12. The sheet forming apparatus according to claim 11, wherein the plurality of second joining holes includes a greater number of joining holes than the plurality of first joining holes.

* * * * *